(12) United States Patent
Salvi et al.

(10) Patent No.: US 7,742,545 B2
(45) Date of Patent: Jun. 22, 2010

(54) METHOD AND APPARATUS FOR GENERATING CORRECTED QUADRATURE PHASE SIGNAL PAIRS IN A COMMUNICATION DEVICE

(75) Inventors: Raul Salvi, Boca Raton, FL (US); Pedro J. Landin, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 568 days.

(21) Appl. No.: 11/755,540

(22) Filed: May 30, 2007

(65) Prior Publication Data

US 2008/0298495 A1    Dec. 4, 2008

(51) Int. Cl.
*H03K 9/06* (2006.01)
*H04L 27/12* (2006.01)

(52) U.S. Cl. ...................... 375/322; 375/302

(58) Field of Classification Search ................ 375/302, 375/322, 316, 324, 295–296; 455/255, 258, 455/265, 114.2–114.3
See application file for complete search history.

(56) References Cited

U.S. PATENT DOCUMENTS

| | | | |
|---|---|---|---|
| 5,306,971 A | 4/1994 | McCune | |
| 5,983,082 A | 11/1999 | Hilbert | |
| 6,255,877 B1 | 7/2001 | Thomasson | |
| 6,356,149 B1 | 3/2002 | Stengel et al. | |
| 6,441,780 B1 * | 8/2002 | Rog et al. | 342/357.12 |
| 6,441,781 B1 * | 8/2002 | Rog et al. | 342/357.12 |
| 6,560,449 B1 | 5/2003 | Liu | |
| 6,714,765 B1 | 3/2004 | Kimppa | |
| 7,031,409 B2 * | 4/2006 | Brobston et al. | 375/345 |
| 7,075,377 B2 | 7/2006 | Metaxakis | |
| 7,492,832 B2 * | 2/2009 | Harron et al. | 375/298 |
| 7,630,697 B2 * | 12/2009 | Taylor et al. | 455/255 |
| 2002/0042255 A1 | 4/2002 | Prentice | |
| 2002/0181619 A1 | 12/2002 | McCune, Jr. | |

FOREIGN PATENT DOCUMENTS

EP    1589713 A2    10/2005

OTHER PUBLICATIONS

PCT International Search Report Applicaiton No. PCT/US2008/064289 Dated Oct. 30, 2008—13 Pages.

* cited by examiner

*Primary Examiner*—Khanh C Tran
(74) *Attorney, Agent, or Firm*—Barbara R. Doutre

(57) ABSTRACT

A method and an apparatus (300) for generating corrected quadrature phase signal pairs in a communication device are provided. The apparatus (300) includes a quadrature phase generator (310), programmable delay elements (320, 330) and a control circuit (360). The programmable delay elements (320, 330) receive a quadrature phase signal pair (signals I 312 and Q 314) from the quadrature phase generator (310). The control circuit (360) generates a control signal (362) based on outputs (325, 335) of the programmable delay elements (320, 330). The control signal (362) configures the programmable delay elements (320, 330). The programmable delay elements (320, 330) are configured to adjust delay between the signals I (312) and Q (314). The programmable delay elements (320, 330) are also used to adjust duty cycle for the quadrature phase signal pair to provide the corrected quadrature phase signal pair.

23 Claims, 7 Drawing Sheets

METHOD AND APPARATUS FOR GENERATING CORRECTED QUADRATURE PHASE SIGNAL PAIRS IN A COMMUNICATION DEVICE

FIELD OF THE INVENTION

The present invention generally relates to quadrature phase signal generation and more specifically, to a method and apparatus for correcting quadrature phase signal pairs in communication devices.

BACKGROUND

Quadrature phase generators are widely used for a variety of modulation and demodulation schemes in various wireless communication devices. Some of these schemes include Quadrature Phase Shift Keying (QPSK) and Quadrature Amplitude Modulation (QAM) and the like. The quadrature phase generator takes a local oscillator (LO) signal and generates a pair of quadrature phase signals typically referred to as in-phase signal I and quadrature phase signal Q. The signals I and Q have frequency related to the LO frequency and have a phase difference of 90 degrees.

The design and topology of quadrature phase generators, along with the transmitter and receiver architectures within which they are used, vary for different communication devices. Several designs, such as divide-by-N flip flop circuits (where N is an even integer) and polyphase filters, exist. However, due to internal integrated circuit design and device tolerances, signal paths for the I and Q signals may have different propagation delays. As a result, the I and Q signals do not have an ideal quadrature phase difference of 90 degrees at the outputs of the quadrature phase generator. Any variation from the ideal quadrature phase difference of 90 degrees at the outputs of the quadrature phase generator is defined as a relative phase error between the I and Q signals.

FIG. 1 is an example illustrating error prone quadrature phase signal pairs ([I, Q] and [Ix, Qx]) generated by a typical quadrature phase generator. For the illustrated example, two error prone quadrature signal pairs should ideally be differentially related, i.e. in-phase signals I (0 degrees) 110 and Ix (180 degrees) 130, and the quadrature phase signals Q (90 degrees) 120 and Qx (270 degrees) 140 should have a phase difference of 180 degrees. However, due to the different propagation delays, the in-phase signals I 110 and Ix 130 have phase of 2 degrees and 179 degrees, and the quadrature phase signals Q 120 and Qx 140 have phase of 88 degrees and 271 degrees. Hence, the signals I 110 and Q 120 have a phase difference of 86 degrees (a relative phase error of −4 degrees) and the signals Ix 130 and Qx 140 have a phase difference of 92 degrees (a relative phase error of 2 degrees). The relative phase error for quadrature phase signal pairs subsequently results in errors in transmitting and receiving signals in a communication device.

FIG. 2 is a block diagram illustrating a prior art communication device 200 utilizing quadrature phase generators 220, 270 for a transmitter 210 and a receiver 260. The transmitter 210 utilizes transmitter (TX) quadrature phase generator 220 for modulating data 231, 233 to be transmitted. The receiver 260 utilizes receiver (RX) quadrature phase generator 270 for demodulating a received signal, for instance, a prefiltered signal 285.

In the transmitter 210, pre-amplifiers 230, 232 amplify the data 231 and 233 respectively to provide amplified signals 241, 243. Subsequently, TX filters 240, 242 pre-filter the amplified signals 241, 243 to provide bandlimited I/Q baseband signals 251, 253 to mixers 250, 252 respectively. The TX quadrature phase generator 220 takes LO signal 205 and provides I signal 221 and Q signal 223. The LO I signal 221 is provided to mixer 250 while the LO Q signal 223 is provided to mixer 252. Mixer 250 up-converts the bandlimited I signal 251 with the LO I signal 221 to provide RF signals 255. Mixer 252 up-converts the bandlimited Q signal 253 with the LO Q signal 223 to provide RF signal 257. Ideally, RF signals 255, 257 are phase shifted 90 degrees, but in reality these signals are prone to error. A combiner 254 combines the RF signals 255, 257 to provide a modulated signal 259 to a TX antenna (not shown) for transmission.

In the receiver 260, a RX antenna (not shown) receives a signal 281 or 283. A switch 282 switches between the signals 281, 283 based on a desired band for demodulation. A pre-filter 280 filters a signal (281 or 283) from the switch 282 to provide a prefiltered signal 285 to a pre-amplifier 286. The pre-amplifier 286 subsequently amplifies the prefiltered signal 285 to provide signals 287, 289 to mixers 290, 292 respectively. The RX quadrature phase generator 270 takes the LO input 205 and provides I signal 271 and Q signal 273 which are respectively provided to mixers 290, 292. Mixer 290 down converts signal 287 with I signal 271, while mixer 292 down converts signal 289 with Q signal 273. Ideally, the mixers 290 and 292 generate baseband signals 291, 293 with a phase difference of 90 degrees, but in reality these signals are prone to error. RX filters 298, 299 filter the baseband signals 291, 293 to provide demodulated baseband signals I 295 and Q 297.

Due to the relative phase error between the signal I 221 and the signal Q 223, the modulated signal 259 generated by the transmitter 210 contains an undesirable sideband image. Similarly, the relative phase error between the signal I 271 and the signal Q 273 results in an undesirable sideband image in the demodulated baseband signals 295, 297 generated by the receiver 260. Subsequently, the undesirable sideband images for the receiver and the transmitter may result in severe errors in detection of data during digital demodulation (receiver) or modulation (transmitter).

Common approaches for avoiding the problems associated with the relative phase error include modifying the phase for the baseband signals (data 231, 233) to be transmitted to match the phase difference between the signals I 221 and Q 223. Similarly, the received signal 285 is down-converted to the demodulated baseband signals 295, 297 to detect relative phase error. The phase for signals 295, 297 are adjusted based on the detected relative phase error. However, as the baseband signals for the transmitted and received signals have different relative phase errors, a separate quadrature phase generator is required for the transmitter 210 and the receiver 260. Circuit complexity, parts count, board area, power consumption, controller and logic complexity, and cost are major challenges for the communication devices using the aforementioned approaches.

Other approaches for addressing the problem of relative phase error in quadrature phase generators have been suggested. Approaches require a phase detector and several additional components such as filters, and operational amplifiers, and integrators in a feedback path to provide a phase adjustment signal for adjusting the phase of the I and Q signals. Again, circuit complexity and parts count are major concerns for such approaches. Furthermore, these approaches require a separate phase adjustment signal for each signal generated by the quadrature phase generator which adds to the complexity of the control circuitry used in the quadrature phase generator.

Accordingly, it would be desirable to have a method and apparatus capable of generating I and Q signals without the aforementioned issues.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
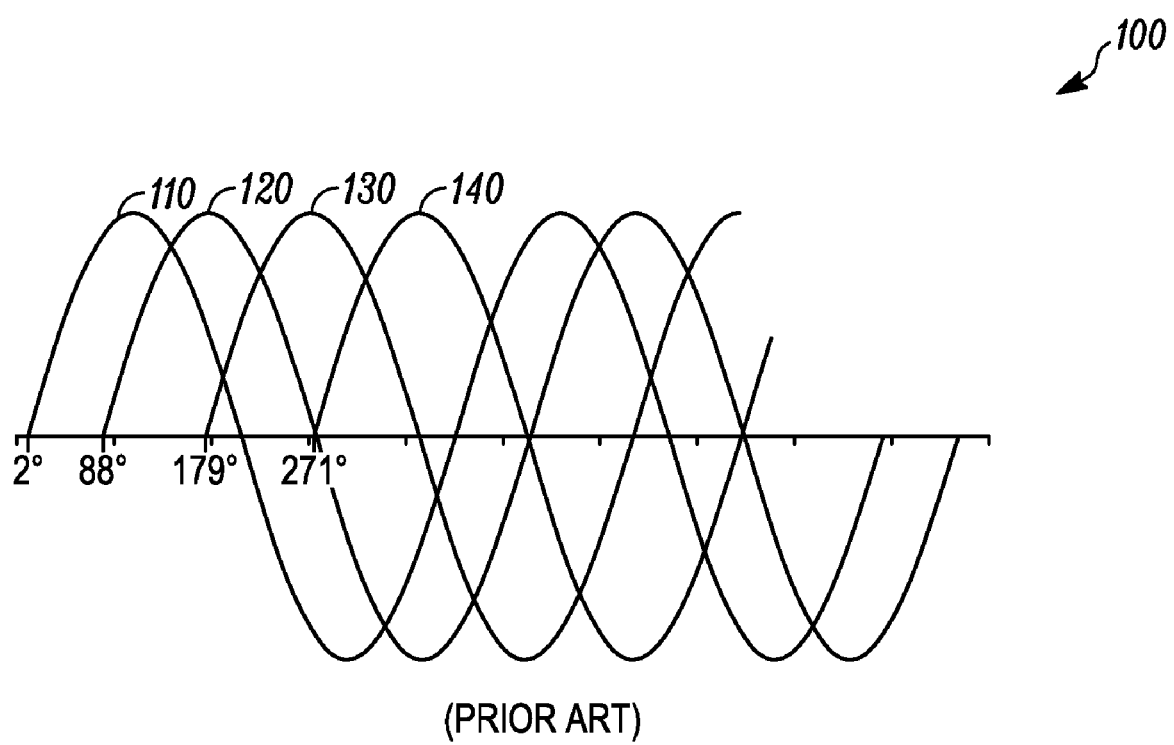
FIG. 1 is an example illustrating typical error prone quadrature phase signal pairs.
Figure 2:
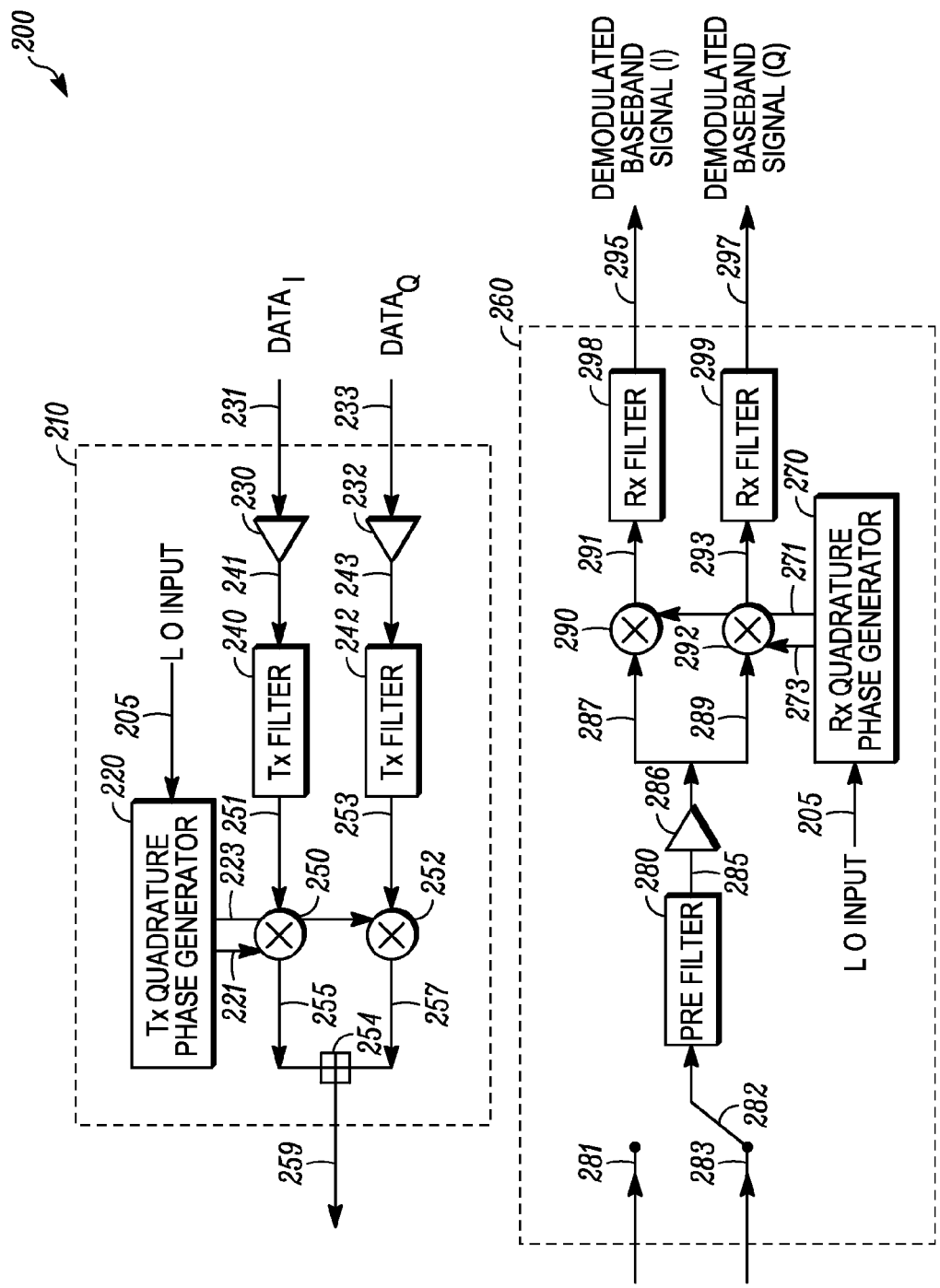
FIG. 2 is a block diagram illustrating a prior art communication device utilizing quadrature phase generators.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in an apparatus and a method for generating a corrected quadrature phase signal pair. The apparatus of the present invention provides corrected in-phase and quadrature phase signals which may be utilized in a communication device using modulation schemes such as Quadrature Phase Shift Keying (QPSK), Quadrature Amplitude Modulation (QAM) and the like. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Briefly, in accordance with the present invention, there is provided herein a method and an apparatus for generating corrected quadrature phase signal pairs in a communication device. The apparatus formed in accordance with the present invention includes a quadrature phase generator, programmable delay elements and a control circuit. The programmable delay elements are coupled to the outputs of the quadrature phase generator. The control circuit is used to generate control signal(s) based on the outputs of the programmable delay elements. The control signal(s) are used for configuring the programmable delay elements. The programmable delay elements are configured to adjust the delay between an in-phase signal and a quadrature phase signal produced by the quadrature phase generator. The programmable delay elements are also used to adjust the duty cycle for the quadrature phase signal pairs.

Figure 3:
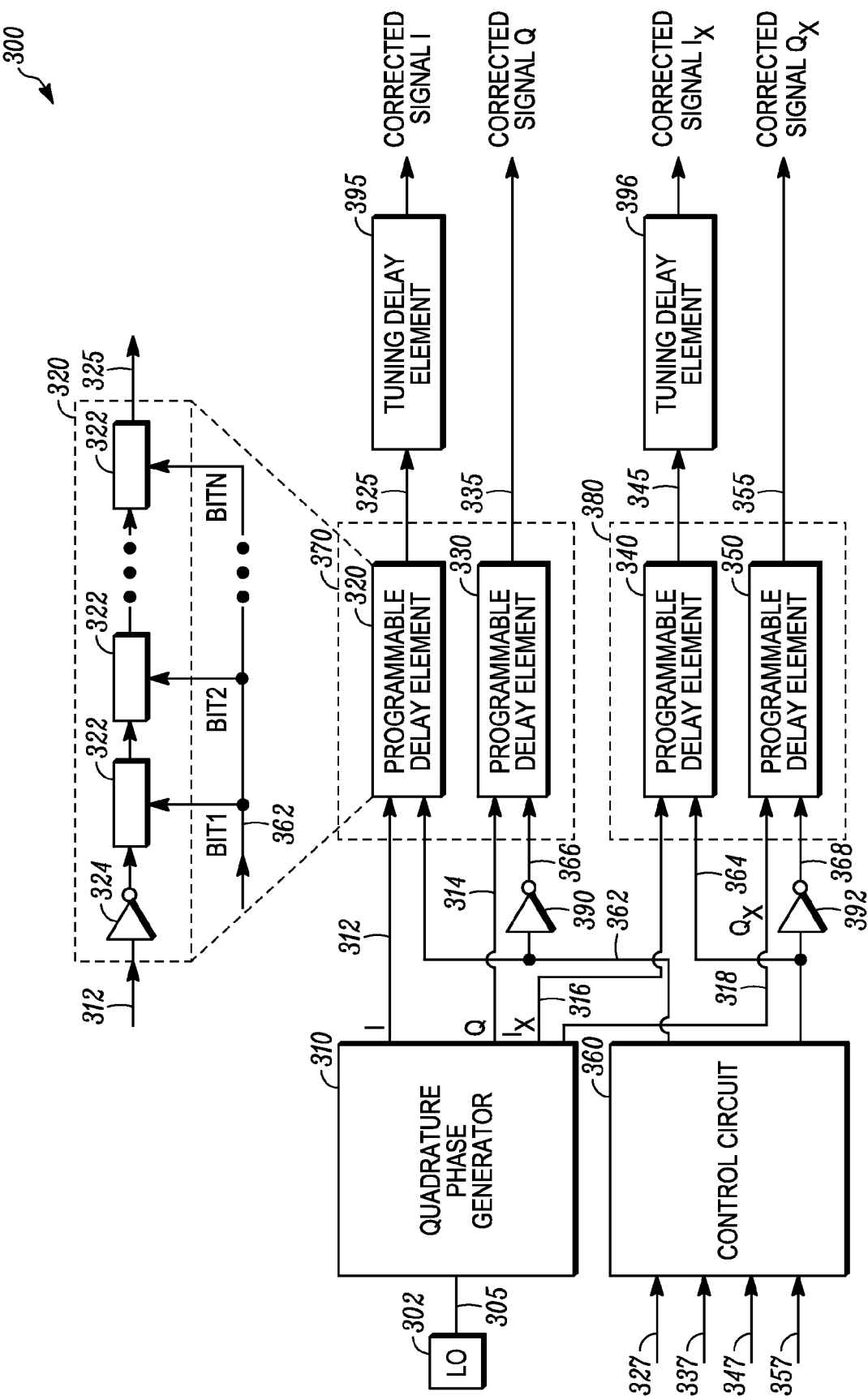
FIG. 3 is a block diagram illustrating an apparatus for generating a corrected quadrature phase signal pair in accordance with some embodiments of the invention.

FIG. 3 is a block diagram illustrating an apparatus 300 for generating a corrected quadrature phase signal pair in accordance with some embodiments of the invention. The apparatus 300 is preferably incorporated as a signal generator within a communication device (shown later) for modulating and demodulating data using an in-phase signal and a quadrature phase signal. Apparatus 300 includes a Local Oscillator (LO) 302 providing a LO input signal 305 to a quadrature phase generator 310 having programmable delay elements 320, 330, 340, 350 coupled thereto. In accordance with the illustrated embodiment, corrected quadrature phase signal pair(s) (corrected in-phase and quadrature phase signal(s)) are generated as outputs 325, 335, 345, 355 of the programmable delay elements 320, 330, 340, 350.

The apparatus 300 comprises a quadrature phase generator 310, programmable delay elements 320, 330 and a control circuit 360. LO 302 provides the LO input signal 305 to the quadrature phase generator 310. The quadrature phase generator 310 provides a quadrature phase signal pair 312, 314 comprising a first quadrature phase signal, hereafter referred to as an in-phase signal I 312, and a second quadrature phase signal, hereafter referred to as a quadrature phase signal Q 314. The programmable delay elements 320, 330 form a programmable delay element pair 370 to receive the quadrature phase signal pair 312, 314. The programmable delay element pair 370 comprises a first programmable delay element 320 for receiving the signal I 312 and a second programmable delay element 330 for receiving the signal Q 314. The control circuit 360 generates a control signal 362 based on the outputs 325, 335 of the programmable delay element pair 370. The control signal 362 may be a binary control signal, one shot logic signal, hex signal or any other suitable control signal. For the purposes of this application the control signal 362 will be described as a binary control signal. The programmable delay element pair 370 is configured by the binary control signal 362 to thereby provide the corrected quadrature phase signal pair as the outputs 325, 335 of the programmable delay element pair 370.

In accordance with some embodiments, the apparatus 300 may further comprise a tuning delay element 395 coupled to one of the programmable delay elements 320, 330. Furthermore, in some embodiments the quadrature phase generator 310 may generate an additional quadrature phase signal pair illustrated here as quadrature phase signal pair 316, 318 comprising a third quadrature phase signal, hereafter referred to as an additional in-phase signal Ix 316, and a fourth quadrature phase signal, hereafter referred to as an additional quadrature phase signal Qx 318.

In accordance with the illustrated embodiment, the apparatus 300 may further comprise an additional programmable delay element pair 380. The additional programmable delay element pair 380 includes the programmable delay elements 340, 350, for receiving the signals Ix 316 and Qx 318. The control circuit 360 may generate an additional binary control signal 364 in response to outputs 345, 355 of the additional programmable delay element pair 380. Furthermore, the additional programmable delay element pair 380 may be configured by the additional binary control signal 364 to thereby provide the corrected quadrature phase signal pair as the outputs 345, 355 of the additional programmable delay element pair 380.

The apparatus 300 may further comprise a weighted inverter 390 to provide an inverted binary control signal 366 to one of the programmable delay elements, for instance to the programmable delay element 330, of the programmable delay element pair 370. Similarly, the apparatus 300 of the illustrated embodiment may further comprise an additional binary weighted inverter 392 to provide an inverted additional binary control signal 368 to one of the programmable delay elements, for instance to the programmable delay element 350, of the additional programmable delay element pair 380.

The quadrature phase generator 310 is designed to generate at least one quadrature phase signal pair. Each generated quadrature phase signal pair should ideally have a phase difference of 90 degrees between the in-phase signal (I or Ix) and the quadrature phase signal (Q or Qx). However, due to the aforementioned problems, signal path for signals I 312, Ix 316, Q 314, and Qx 318 may have different propagation delays resulting in phase errors as illustrated in FIG. 1. Hence, the phase difference between the in-phase signal and the quadrature phase signal may not be 90 degrees. Variation from the ideal phase difference of 90 degrees is defined as a relative phase error.

The control circuit 360 is designed to receive signals 327, 337, 347, 357 derived from outputs 325, 335, 345, 355 of the programmable delay element pair 370 and the additional programmable delay element pair 380. Furthermore, the control circuit 360 is designed to provide at least one control signal comprising a plurality of bits (BIT 1, BIT 2, . . . , BIT N) for configuring programmable delay element pair(s). For instance, the control circuit 360 generates the binary control signal 362 and the additional binary control signal 364, for configuring the programmable delay element pair 370 and the additional programmable delay element pair 380 respectively.

FIG. 3 also illustrates the first programmable delay element 320 in accordance with some embodiments of the invention. The programmable delay element 320 may comprise a plurality of binary weighted voltage-controlled delays 322. In accordance with some embodiments, the plurality of binary weighted voltage-controlled delays 322 of the programmable delay element 320 are connected in series. The plurality of binary weighted voltage-controlled delays 322 are designed to be operable using a binary signal, for instance the binary control signal 362. In accordance with the illustrated embodiment, each voltage-controlled delay 322 may be enabled or disabled by a bit (BIT 1, BIT 2 . . . , BIT N) or an inverted bit of the plurality of bits of the binary signal.

When enabled, each voltage-controlled delay 322 delays an input signal, for instance the signal I 312, by a predetermined time period. In accordance with some embodiments, each voltage-controlled delay 322 may delay the input signal by the predetermined time period which is a binary weighted multiple (1×, 2×, 4×, 8×, etc) of a constant time period. In accordance with some other embodiments, each voltage-controlled delay 322 may delay the input signal by the predetermined time period which is the constant time period. The programmable delay element 320 may further comprise an inverter 324 for driving current for the voltage-controlled delays 322.

Operationally, the quadrature phase generator 310 of the illustrated embodiment, generates the signals I 312 and Q 314 in response to the LO input signal(s) 305. The control circuit 360 generates the binary control signal 362 based on the outputs 325, 335. In accordance with some embodiments, the binary control signal 362 is generated by detecting the relative phase error for the signals 327, 337 derived from the outputs 325, 335.

Operationally, the programmable delay elements may initially be preconfigured to enable some of the plurality of binary weighted voltage-controlled delays. Thus, the programmable delay elements may initially be preconfigured to delay the signals I 312, Q 314, Ix 316 and Qx 318 by a preconfigured time period. The programmable delay elements, when configured by the binary control signal 362 and the additional binary control signal 364, varies (increases or decreases) amount of delay from the preconfigured time period. A range between maximum and minimum amount of delay for the programmable delay element is referred to as a tuning range for the programmable delay element.

In accordance with some embodiments, the first programmable delay element 320 and the second programmable delay element 330 are preconfigured for the preconfigured time period which is approximately at middle of the tuning range. The first programmable delay element 320, receiving the signal I 312 is configured by the binary control signal 362, and the second programmable delay element 330, receiving the signal Q 314, is configured by the inverted binary control signal 366. Hence, the first programmable delay element 320 and the second programmable delay element 330 are oppositely configured resulting in opposite delays. The delay is adjusted for rising edge and falling edge of the quadrature phase signal pair 312, 314 to simultaneously adjust the duty cycle of the quadrature phase signal pair 312, 314.

Thus, the binary control signal 362 configures the programmable delay element pair 370 to adjust the delay for the signals I 312 and Q 314. The programmable delay element pair 370 thereby adjusts the delay (relative phase error) between the signals I 312 and Q 314 and the duty cycle of the signals I 312 and Q 314 to thereby provide the corrected signals I and Q as the outputs 325, 335.

Operationally, the quadrature phase generator 310 of the illustrated embodiment, may further generate the signals Ix 316 and Qx 318 in response to the LO input signal(s) 305. The control circuit 360 may also generate the additional binary control signal 364 in response to the outputs 345, 355. In accordance with some embodiments, the additional binary control signal 364 is generated by detecting the relative phase error for the signals 347, 357 derived from the outputs 345, 355. The delay between the signals Ix 316 and Qx 318, and the duty cycle of the additional quadrature signal pair 316, 318 may be adjusted in a similar fashion as the delay between the signals I 312 and Q 314.

Thus, the additional binary control signal 364 configures the additional programmable delay element pair 380 to adjust the delay for the signals Ix 316 and Qx 318. Hence, the additional programmable delay element pair 380 thereby adjusts the delay (relative phase) between the signals Ix 316 and Qx 318 and the duty cycle of the signals Ix 316 and Qx 318 to thereby provide the corrected signals Ix and Qx as the outputs 345, 355 of the additional programmable delay element pair.

Furthermore, the tuning delay element 395, when added, additionally delays the output 325 of the programmable delay element pair 370. Hence, the tuning delay element 395 adjusts the tuning range of the programmable delay elements 320, 330 to overcome problems caused by the variations due to the semiconductor manufacturing technologies. Similarly, the apparatus 300 may further comprise a tuning delay element 396 coupled to one of the programmable delay elements 340, 350.

In accordance with some embodiments, the quadrature phase generator 310 of the apparatus 300 may be implemented with a divide-by-N flip flop circuit, a polyphase filter, or the like. Furthermore, the quadrature phase generator 310 may generate other signals as required by the apparatus 300. Accordingly, the apparatus 300 may include other programmable delay elements to receive other signals generated by the quadrature phase generator 310.

In accordance with some embodiments, the control circuit 360 of the apparatus 300 may be a digital signal processor (DSP), an application specific integrated circuit (ASIC), or the like. The control circuit 360 may be configured to receive the signals, for instance the signals 327, 337 derived from the outputs 325, 335 of the programmable delay element pair(s). In accordance with some embodiments, the signals derived from outputs of the programmable delay element pair(s) may be down converted baseband signals derived by demodulating received data using the outputs of programmable delay element pair(s). In accordance with some other embodiments, the signals derived from outputs of programmable delay element pair(s) may be Radio Frequency (RF) signals derived by modulating data using the outputs of programmable delay element pair(s). In accordance with yet other embodiments, the control circuit 360 may be configured to receive the outputs of programmable delay element pair(s). Thus, the apparatus 300 may be used to generate corrected quadrature phase signal pair(s) for a transmitter and a receiver.

In accordance with some other embodiments, the control circuit 360 of the apparatus 300 may generate binary signal(s) by using techniques such as user controlled feedback, DSP demodulation and quadrature phase determination, spectrum analysis, time sampled phase error detection, etc. In accordance with other embodiments, the control circuit 360 may generate binary control signal(s) based on a lookup table with entries for a relative phase error between the in-phase signals and quadrature signals and a corresponding binary control signal value. Furthermore, while the control circuit 360 of the illustrated embodiment generates binary control signal(s) for each programmable delay element pair, in accordance with other embodiments, the control circuit 360 may generate other binary control signals for other programmable delay element pairs as required. In accordance with yet other embodiments, the control circuit 360 may provide a separate binary control signal for each programmable delay element. In accordance with other embodiments, the control circuit may generate other control signal(s) such as hexadecimal, one shot logic, etc.

Programmable delay element 320 may be implemented in a variety of ways. The programmable delay element 320 can be implemented, for example, utilizing electrical and/or mechanical technology, such as transistors, inductors, capacitors, and/or MEMS devices to name a few. Any means of creating a signal delay or signal advancement to vary drive strength can be used. In accordance with the illustrated embodiment, a plurality of binary weighted voltage controlled delays 322 may be circuits utilizing voltage-controlled capacitors, inductors or metal oxide semiconductor (MOS) transistor devices, inverters or combination of these. In accordance with some other embodiment the programmable delay element may further comprise an inverter, for instance the inverter 324, configured to provide a variable drive strength in response to the control signal. In accordance with other embodiments, the programmable delay element may be designed to be operable using other control signal(s) such as hexadecimal, one shot logic, or the like. Furthermore, illustrated architecture of the programmable delay element 320 may be used for other programmable delay elements of the apparatus 300, for instance the programmable delay elements 330, 340, 350.

Figure 4:
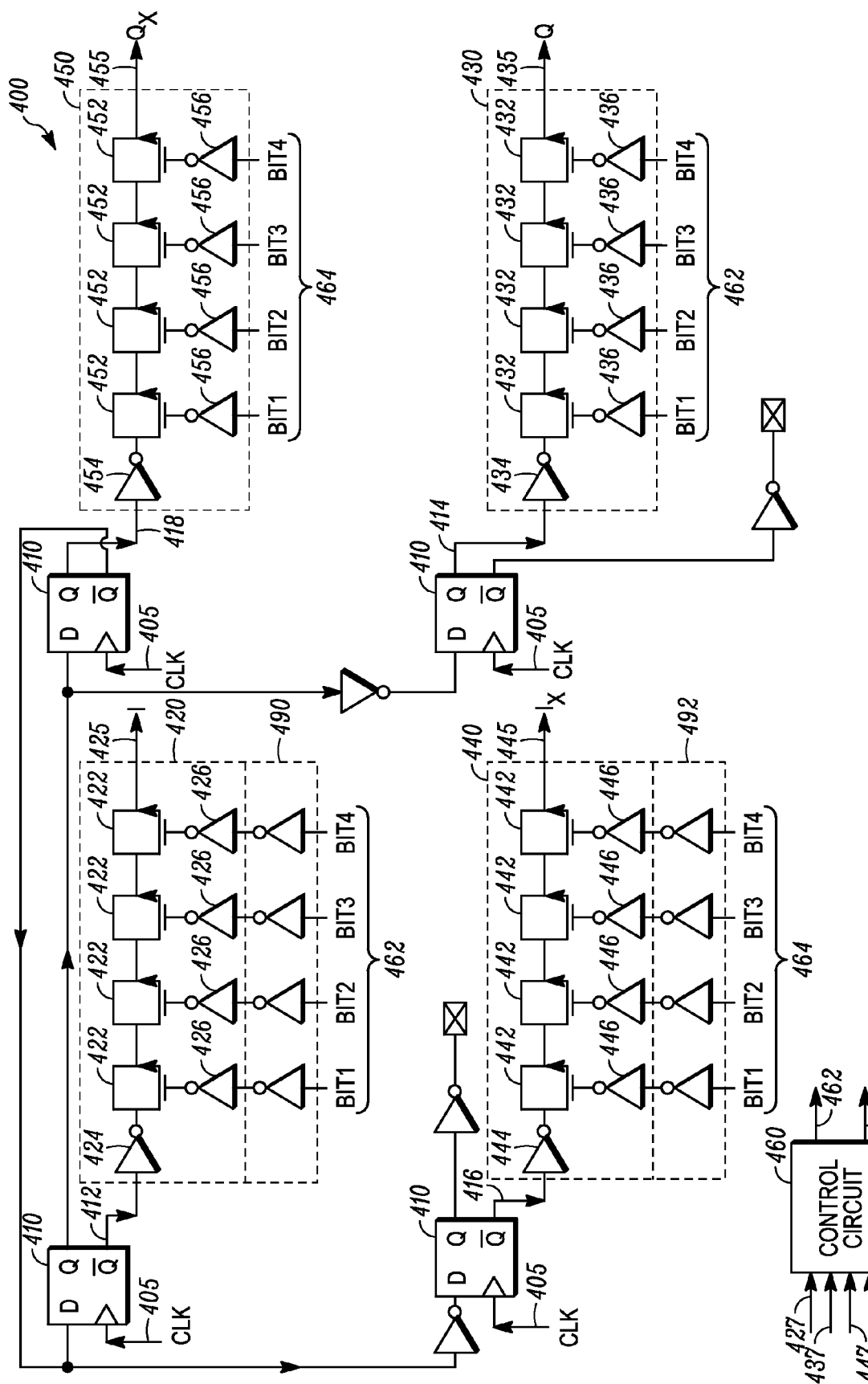
FIG. 4 is an exemplary schematic diagram illustrating the apparatus of FIG. 3 in accordance with some embodiments of the invention.

FIG. 4 is an exemplary schematic diagram illustrating an apparatus 400 for generating corrected quadrature phase signal pairs in accordance with some embodiments of the invention. The apparatus 400 comprises four D-type flip-flops 410, programmable delay elements 420, 430, 440, 450 and a control circuit 460. A quadrature phase generator of the illustrated embodiment is implemented using a divide-by-N flip flop circuit comprising the D-type flip-flops 410. The divide-by-N flip flop circuit receives an LO input signal 405 as an input for CLK node of the D-type flip flops 410 and produces signals I 412, Q 414, Ix 416, and Qx 418. The signals 412, 414, 416, 418 are provided to the programmable delay elements 420, 430, 440, 450. In the illustrated embodiment, the apparatus 400 thereby generates corrected in-phase (I, Ix) and quadrature phase signals (Q, Qx) as outputs I 425, Q 435, Ix 445, Qx 455 of the programmable delay elements 420, 430, 440, 450.

The quadrature phase generator is similar to the quadrature phase generator 310 described above. The divide-by-N flip flop circuit generates a first quadrature phase signal pair comprising a first quadrature phase signal, referred to as the signal I 412 and a second quadrature phase signal, referred to as the signal Q 414. The divide-by-N flip flop circuit also generates a second quadrature phase signal pair comprising a third quadrature phase signal, referred to as the signal Ix 416 and a fourth quadrature phase signal, referred to as the signal Qx 418. As mentioned with reference to FIG. 3, the signals I 412 and Q 414, ideally have phase difference of 90 degrees. Similarly, the signals Ix 416 and Qx 418 ideally have phase difference of 90 degrees. However, due to the aforementioned problems, the signals I 412 and Q 414, and the signals Ix 416 and Qx 418 may have relative phase errors.

The programmable delay elements 420, 430 form a first programmable delay element pair to receive the first quadrature phase signal pair 412, 414. Similarly, the programmable delay elements 440, 450 form a second programmable delay element pair to receive the second quadrature phase signal pair 416, 418.

The control circuit 460 generates a first control signal 462, for example a binary control signal, in response to the outputs 425, 435 of the first programmable delay element pair. The control circuit 460 also generates a second control signal 464, for example another binary control signal, in response to the outputs 445, 455 of the second programmable delay element pair. The control circuit 460 provides the first binary control signal 462 to the first programmable delay element pair. The control circuit 460 provides the second binary control signal 464 to the second programmable delay element pair.

The first programmable delay element pair is configured by the first binary control signal 462 to thereby provide corrected first quadrature phase signal pair as the outputs 425, 435 of the first programmable delay element pair. Similarly, the second programmable delay element pair is configured by the second binary control signal 464 to thereby provide corrected second quadrature phase signal pair as the outputs 445, 455 of the second programmable delay element pair.

In accordance with the illustrated embodiment, each of the first binary control signal 462 and the second binary control signal 464 comprise four bits (BIT 1, ..., BIT 4). Each programmable delay element 420, 430, 440, 450, may comprise a plurality of voltage-controlled N-type metal oxide semiconductor (NMOS) transistor devices 422, 432, 442, 452. The plurality of voltage-controlled N-type metal oxide semiconductor (NMOS) transistor devices are connected in series. In accordance with the illustrated embodiment, each programmable delay element 420, 430, 440, 450 comprises four NMOS transistor devices, for instance four NMOS transistor devices 422 for the programmable delay element 420, connected in series.

Each NMOS transistor device comprises a drain and a source node coupled together. Furthermore, each NMOS transistor device 422, 432 comprises a gate node for receiving a bit (BIT 1, ..., BIT 4) and an inverted bit of the first binary control signal 462 respectively. Similarly, each NMOS transistor device 442, 452 comprises a gate node for receiving a bit (BIT 1, ..., BIT 4) and an inverted bit of the second binary control signal 464 respectively. Each voltage-controlled NMOS transistor device is enabled or disabled in response to the bit (BIT 1, BIT2, BIT 3, or BIT 4), of a binary signal. Thus, each voltage-controlled NMOS transistor device, when enabled, introduces delay to an input signal.

Furthermore, each NMOS transistor device, for instance the NMOS transistor devices 422, is designed to have a different aspect ratio. For the illustrated embodiment, the aspect ratio of the four NMOS transistor devices is 1×, 2×, 4×, and 8× of a predefined aspect ratio. The predefined aspect ratio is determined based on the smallest amount of delay, also the constant time period as described earlier, that may be introduced by the programmable delay element. The smallest amount of delay that may be introduced by the programmable delay element is determined based on delay introduced by smallest NMOS transistor device and is also known as resolution of the programmable delay element. Furthermore, the tuning range of the programmable delay elements 420, 430, 440, 450 ranges from 0× to 15× of the constant time period.

In the illustrated embodiment, each programmable delay element further comprises a driving inverter, for instance inverter 424, for driving the plurality of voltage-controlled NMOS transistor devices. Furthermore, the programmable delay elements further comprise a plurality of driving inverters, for instance inverters 426, to drive the gate nodes of the voltage-controlled NMOS transistor devices.

The apparatus 400 further comprises a first binary weighted inverter 490 for providing the bits of the first binary control signal 462 to the programmable delay element 420. The apparatus 400 further comprises a second binary weighted inverter 492 for providing the bits of the second binary control signal 464 to the programmable delay element 440.

Operationally, the quadrature phase generator generates the first quadrature signal pair 412, 414 and the second quadrature signal pair 416, 418. Initially, the outputs 425, 435 of the first programmable delay element pair are the first quadrature phase signal pair 412, 414 delayed by a preconfigured time period. Similarly, the outputs 445, 455 of the second programmable delay element pair are the second quadrature phase signal pair 416, 418 delayed by the preconfigured time period. For the illustrated embodiment, the signals I 412, Q 414, Ix 416, and Qx 418 are delayed by the preconfigured time period which is at the middle of the tuning range, in this case 8× of the predefined time period. The control circuit 460 generates the first binary control signal 462 and the second binary control signal 464 in response to the outputs 425, 435 and the outputs 445, 455 respectively. The first binary control signal 462 is used to configure the first programmable delay element pair. The second binary control signal 464 is used to configure the second programmable delay element pair.

The first programmable delay element pair adjusts a delay between the signal I 412 and the signal Q 414 to thereby provide a corrected first quadrature phase signal pair as the outputs 425, 435. In accordance with the illustrated embodiments, the delay of the signals I 412 and Q 414, is oppositely adjusted from the preconfigured time period. The delay is adjusted for rising edge and falling edge of the signals I 412 and Q 414. The first programmable delay element pair, thereby, adjusts the duty cycle of the first quadrature phase signal pair 412, 414. The second programmable delay element also adjusts a delay between the signal Ix 416 and the signal Qx 418 to thereby provide a corrected second quadrature phase signal pair as the outputs 445, 455. Similarly, the second programmable delay element pair also adjusts duty cycle of the second quadrature phase signal pair 416, 418.

Figure 5:
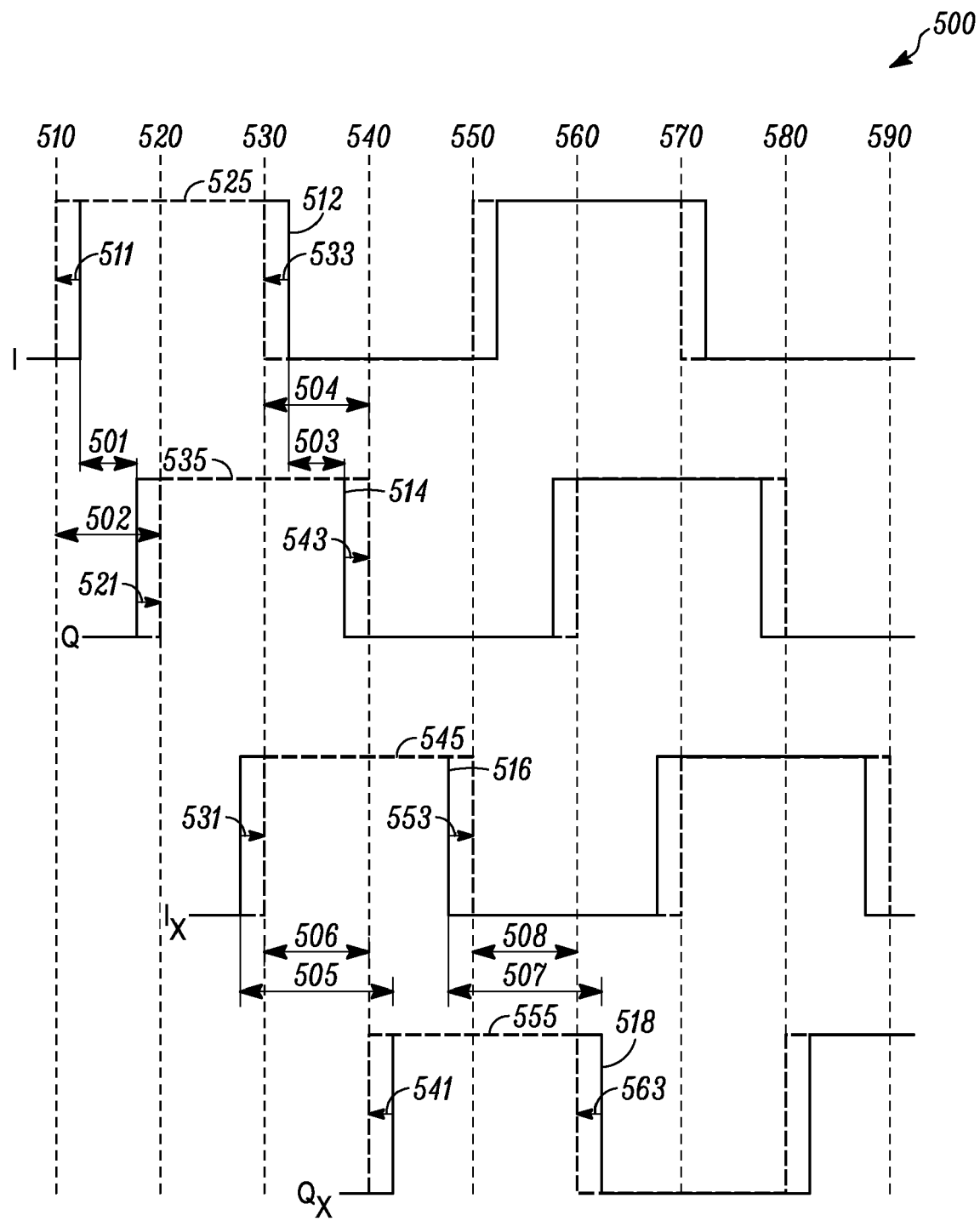
FIG. 5 is an example of a graph illustrating adjusting delay between quadrature phase signal pairs in accordance with some embodiments of the invention.

FIG. 5 is an example of a graph illustrating adjusting the delay between quadrature phase signal pairs in accordance with some embodiments of the invention. The graph 500 illustrates signals I 512, Q 514, Ix 516 and Qx 518 generated by the quadrature phase generator. The graph 500 also illustrates waveforms for outputs 525, 535, 545, 555 of the programmable delay elements configured as described earlier. Dotted lines 510, 520, ..., 590 represent ideal phase for rising or falling edge of the signals I 512, Q 514, Ix 516 and Qx 518.

In accordance with some embodiments, a delay 501 between rising edges of the signals I 512 and Q 514 is adjusted. As illustrated, the delay 501 between the signals I 512 and Q 514 is adjusted in opposite directions 511, 521 to result in delay 502 between rising edges of the outputs 525, 535. Similarly, a delay 503 between falling edges of the signals I 512 and Q 514 is oppositely adjusted 533, 543 for to result in a delay 504 between falling edges of the outputs 525, 535. Adjusting delays between the rising and falling edges of the signals I 512 and Q 514 results in simultaneous adjustment of duty cycle for the outputs 525, 535. Thus, corrected in-phase I and quadrature phase Q signals are thereby provided as the outputs 525,535.

Similarly, delay 505 between rising edges of the signals Ix 516 and Qx 518 is adjusted. As illustrated, the delay 505 between the rising edges of the signal Ix 516 and Qx 518 is adjusted in opposite directions 531, 541 to result in delay 506 between rising edges of the outputs 545, 555. Furthermore, as illustrated, delay 507 between falling edges of the signal Ix 516 and Qx 518 is similarly adjusted 553, 563 to result in delay 508 between falling edges of the outputs 545, 555. Adjusting delays between the rising and falling edges of the signals Ix 516 and Qx 518 results in simultaneous adjustment of duty cycle for the outputs 545, 555. Thus, corrected in-phase Ix and quadrature phase Qx signals are thereby provided as the outputs 545,555.

Graph 500 is shown only for illustrative purposes and several other variants may exist. In accordance with some other embodiments, delay for the falling edges and the rising edges of one of the signals I 512 and Q 514 or the signals Ix 516 and Qx 518 may be adjusted.

Figure 6:
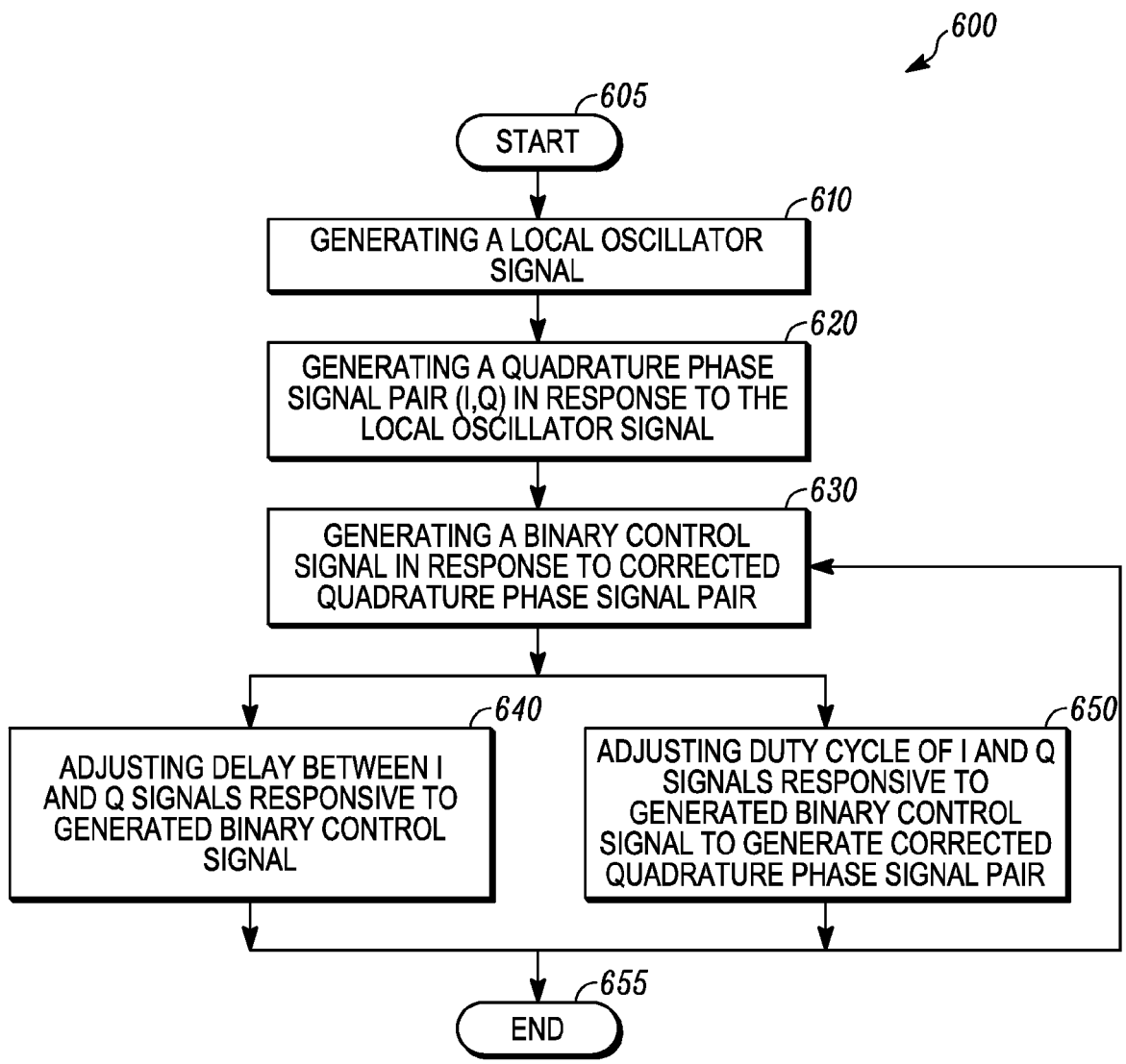
FIG. 6 is a flow chart illustrating a method for generating a corrected quadrature phase signal pair in accordance with some embodiments of the invention.

FIG. 6 is a flow chart illustrating a method 600 of generating a corrected quadrature phase signal pair in accordance with some embodiments of the invention. The method 600 starts at 605 by generating a local oscillator signal at 610.

Subsequently, a quadrature phase signal pair, the in-phase signal I and the quadrature phase signal Q, is generated in response to the LO signal in step 620. The generated quadrature phase signal pair, the signals I and Q, are as described earlier.

The method 600 continues with step 630 by generating a control signal, shown here as a binary control signal, in response to the corrected quadrature phase signal pair. In accordance with some embodiments, the method 600 may further include delaying the quadrature phase signal pair by a preconfigured time period to provide the corrected quadrature phase signal pair before generating the binary control signal. In accordance with some embodiments, the binary control signal is generated in response to the signals derived from the corrected quadrature phase signal pair.

Subsequent to step of generating the binary control signal, the method 600 performs the step 640 of adjusting delay between the quadrature phase signal pair, the signals I and Q, responsive to the binary control signal. In accordance with some embodiments, the step 640 may comprise adjusting the delay between the falling and rising edges of the signals I and Q. Simultaneous to the step 640, method 600 also performs step 650 of adjusting duty cycle of the quadrature phase signal pair responsive to the generated binary control signal. As a result of the steps 640 and 650, the corrected quadrature phase signal pair is generated. Furthermore, the method 600 may continue by repeating the steps of generating the binary control signal through adjusting the duty cycle by continuously adjusting the delay to provide the corrected quadrature phase signal pair.

Additionally, while the steps of method 600 describe generating the corrected quadrature phase signal pair, the method 600 may generate additional quadrature phase signal pair(s). Furthermore, the method 600 may generate additional binary control signal(s) for adjusting delay between the additional quadrature phase signal pair(s). The method 600 may also adjust duty cycle for the additional quadrature phase signal pair(s) to generate additional corrected quadrature phase signal pair(s).

Figure 7:
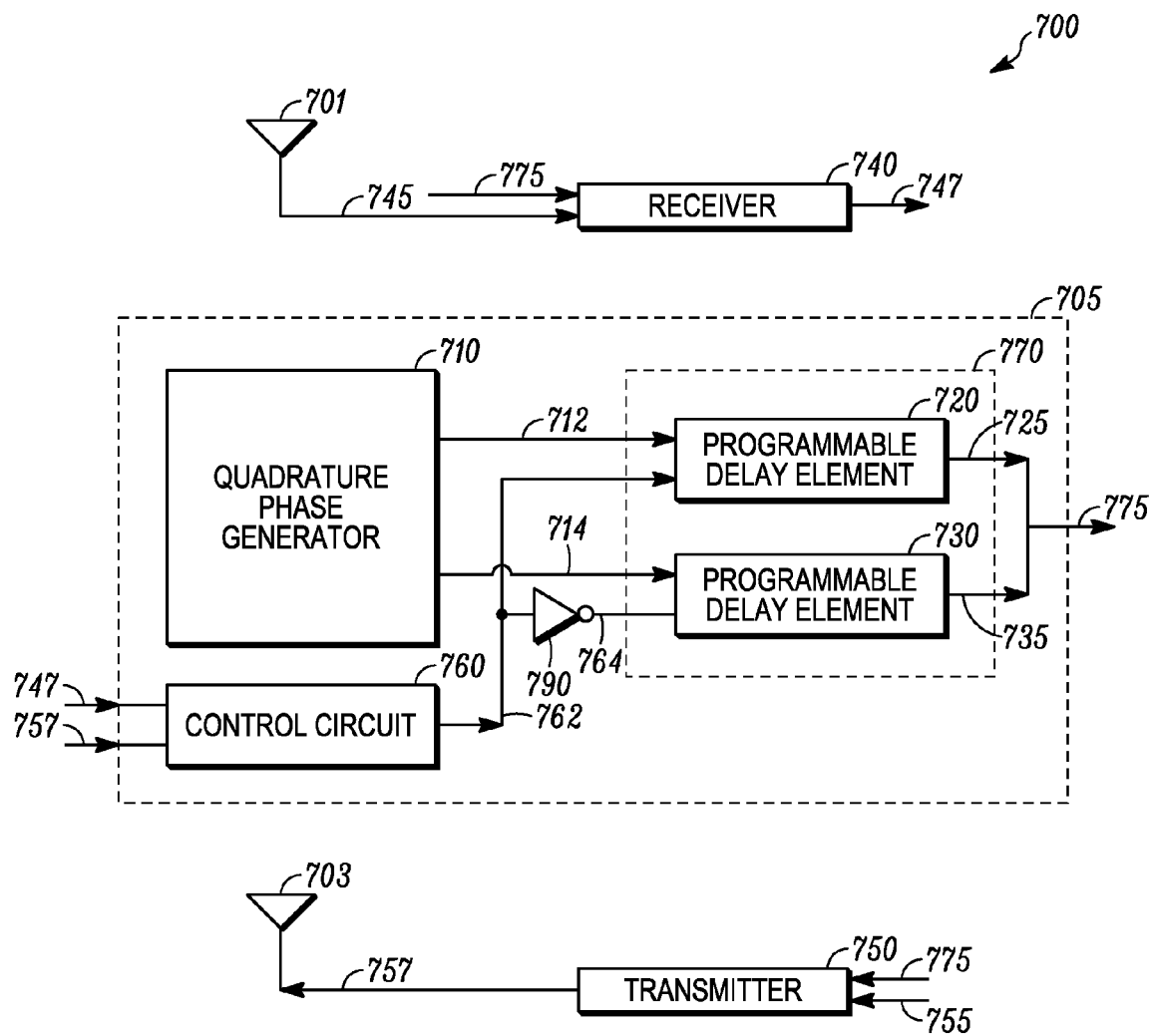
FIG. 7 is a block diagram illustrating an exemplary communication device utilizing the apparatus in accordance with some embodiments of the invention.

FIG. 7 is a block diagram illustrating an exemplary communication device 700 utilizing the apparatus 300 for generating corrected quadrature phase signal pairs in accordance with some embodiments of the invention. The communication device 700 includes antennas 701, 703, the apparatus 300 hereafter referred as a apparatus 705, a receiver 740, and a transmitter 750. In the illustrated embodiment, the apparatus 705 generates a corrected quadrature phase signal pair 775 comprising a corrected in-phase signal 725 and a corrected quadrature phase signal 735 to be utilized in the communication device 700.

In the illustrated embodiment, the receiver 740 and the transmitter 750 require a quadrature phase signal pair for demodulating and modulating data. The receiver 740 and the transmitter 750 use the corrected quadrature phase signal pair 775 generated by the apparatus 705. In this embodiment, the receiver 740 uses the corrected quadrature phase signal pair 775 for demodulating a received signal 745. The receiver 740 thereby provides a demodulated signal pair 747 comprising an in-phase and a quadrature phase demodulated signals. Similarly, the transmitter 750 of the communication device 700 uses the corrected quadrature phase signal pair 775 for modulating data 755. The transmitter 750 thereby provides a modulated signal pair 757 comprising an in-phase and a quadrature phase modulated signal.

As illustrated, the apparatus 705 comprises a quadrature phase generator 710, programmable delay elements 720, 730, and a control circuit 760. The programmable delay elements 720, 730 form a programmable delay element pair 770. The quadrature phase generator 710 generates an in-phase signal I 712 and a quadrature phase signal Q 714. The signals I 712 and Q 714 are provided to the programmable delay element pair 770. The control circuit 760 generates a control signal 762 for the programmable delay element pair 770. The control signal 762 is generated in response to the demodulated signal pair 747 or the modulated signal pair 757. The apparatus 705 also includes a binary weighted inverter 790 for providing an inverted binary control signal 764 for configuring the programmable delay element 730. Thus, the programmable delay element pair 770 provides the corrected quadrature phase signal pair 775 as outputs of the programmable delay element pair 770. The corrected quadrature phase signal pair 775 may be utilized by the receiver 740 or the transmitter 750 of the communication device 700.

Operationally, the communication device 700 uses the corrected quadrature phase signal pair 775 for the receiver 740 and the transmitter 750. The antenna 701 provides the received signal 745 to the receiver 740. The receiver 740 also receives the corrected quadrature phase signal pair 775 from the apparatus 705 to thereby provide the demodulated signal pair 747. In the illustrated embodiment, the apparatus 705 operates as described earlier. The control circuit 760 may use the demodulated signal pair 747 to generate the control signal 762. The control signal 762 and the inverted binary control signal 764 configure the programmable delay element pair 770. Hence, the corrected quadrature phase signal pair 775 is provided as the outputs of the programmable delay element pair 770 for use in the receiver 740.

The transmitter 750 receives data 755 to be transmitted and the corrected quadrature phase signal pair 775 from the apparatus 705 to thereby provide the modulated signal pair 757. The apparatus 705 operates as described earlier. The control circuit 760 may use the modulated signal pair 757 to generate the control signal 762. The control signal 762 and the inverted binary control signal 764 configure the programmable delay element pair 770. Hence, the corrected quadrature phase signal pair 775 is provided as the outputs of the programmable delay element pair 770 for use in the transmitter 750. The modulated signal pair 757 is transmitted by the antenna 703.

In accordance with some other embodiments, the communication device 700 may operate as a multiband communication device. In such a scenario, the apparatus 705 may generate multiple corrected quadrature phase signals of different frequencies to receive or transmit plurality of signals. In accordance with other embodiments, the apparatus 705 may generate multiple corrected quadrature phase signal pairs of different phases based on the modulation/demodulation scheme used by the communication device 700. Further, the receiver 740, the transmitter 750 and the antennas 701, 703 may be combined to form a transceiver or may operate independently. Furthermore, the apparatus 705 may have different architecture based on use of different modulation/demodulation schemes.

Thus, the communication device 700 utilizes a single apparatus 705 for generating multiple quadrature phase signal pairs to achieve a compact and robust design for the communication device 700. The compact design for the communication device 700 facilitates the ability to provide multiband functionality in portable communication devices. Additionally, the robust design for the apparatus 705 reduces the complexity of the control circuitry required for error correction. Thus, the area requirement for the communication device 700 is further reduced.

Hence, there has been provided a method and an apparatus for generating corrected quadrature phase signal pairs. The method and apparatus of the present invention avoids the use of modulated or demodulated baseband signals for error correction in a communication device. The apparatus generating the corrected quadrature phase signal pair allows a designer to remove some of the design restrictions for high precision quadrature phase generator. Thus, the problems such as circuit complexity, parts count, board area, power consumption, controller and logic complexity, and cost are greatly reduced. By utilizing programmable delay elements in the apparatus, the relative phase error for the quadrature signal pairs is reduced.

Additionally, the apparatus is particularly useful in the communication devices using quadrature phase signal pairs. The communication devices using the apparatus of the present inventions avoid problems, such as the sideband images, associated with the relative phase error. Furthermore, the apparatus eliminates the need for separate quadrature phase generators for the receiver and the transmitter of the communication device. Hence, the apparatus and the method achieve a compact and robust design for the communication device.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

The invention claimed is:

1. An apparatus comprising:
   a quadrature phase generator providing a quadrature phase signal pair wherein the quadrature phase signal pair comprises a first quadrature phase signal and a second quadrature phase signal;
   a programmable delay element pair receiving the quadrature phase signal pair, the programmable delay element pair being configured by a binary control signal;
   a control circuit generating the binary control signal in response to outputs of the programmable delay element pair; and
   wherein the programmable delay element pair adjusts a delay between the first quadrature phase signal and the second quadrature phase signal and adjusts a duty cycle of the received quadrature phase signal pair to thereby provide a corrected quadrature phase signal pair as the outputs of the programmable delay element pair.

2. The apparatus of claim 1 further comprising a tuning delay element coupled to a first programmable delay element of the programmable delay element pair to shift a tuning range of the programmable delay element pair.

3. The apparatus of claim 1 further comprising a local oscillator coupled to the quadrature phase generator.

4. The apparatus of claim 1, wherein the programmable delay element pair comprises a first programmable delay element receiving the first quadrature phase signal and a second programmable delay element receiving the second quadrature phase signal.

5. The apparatus of claim 4, wherein the first programmable delay element comprises a plurality of binary weighted voltage-controlled delays.

6. The apparatus of claim 5, wherein each voltage-controlled delay in the plurality of binary weighted voltage-controlled delays receives at least one of a. a bit of the binary control signal and b. an inverted bit of the binary control signal.

7. The apparatus of claim 5, wherein each voltage-controlled delay in the plurality of binary weighted voltage-controlled delays is at least one of: a. a capacitor, b. an inductor, c. a Metal Oxide Semiconductor (MOS) transistor, and d. an inverter.

8. The apparatus of claim 7, wherein the MOS transistor comprises a drain node and a source node coupled together.

9. The apparatus of claim 8, wherein the MOS transistor further comprises a gate node receiving at least one of a. a bit of the binary control signal and b. an inverted bit of the binary control signal.

10. The apparatus of claim 5, wherein the plurality of binary weighted voltage-controlled delays are series connected.

11. The apparatus of claim 4, wherein the first programmable delay element further comprises an inverter configured to provide a variable drive strength in response to the binary control signal.

12. The apparatus of claim 1, wherein the quadrature phase generator provides an additional quadrature phase signal pair comprising a third quadrature phase signal and a fourth quadrature phase signal.

13. The apparatus of claim 12 further comprising an additional programmable delay element pair receiving the additional quadrature phase signal pair, the additional programmable delay element pair being configured by an additional binary control signal.

14. The apparatus of claim 13, wherein the control circuit generates the additional binary control signal in response to outputs of the additional programmable delay element pair.

15. The apparatus of claim 13, wherein the additional programmable delay element pair adjusts a delay between the third quadrature phase signal and the fourth quadrature phase signal and adjusts a duty cycle of the additional quadrature phase signal pair to thereby provide a corrected additional quadrature phase signal pair as the outputs of the additional programmable delay element pair.

16. A method for generating a corrected quadrature phase signal pair comprising:
   generating a local oscillator signal;
   generating a quadrature phase signal pair ([I, Q]) in response to the local oscillator signal, wherein the quadrature phase signal pair comprises a first quadrature phase signal (I) and a second quadrature phase signal (Q);
   generating a control signal in response to the corrected quadrature phase signal pair;
   adjusting a delay between the first quadrature phase signal and the second quadrature phase signal responsive to the generated control signal;
   adjusting duty cycle of the quadrature phase signal pair responsive to the generated control signal, thereby generating the corrected quadrature phase signal pair; and
   delaying the quadrature phase signal pair by a preconfigured time period to provide the corrected quadrature phase signal pair before generating the control signal.

17. The method of claim 16 further comprising utilizing the corrected quadrature phase signal pair for transmitting and receiving.

18. A communication device, comprising:

a receiver;

a transmitter;

a quadrature phase generator providing a quadrature phase signal pair (I, Q) wherein the quadrature phase signal pair comprises a first quadrature phase signal (I) and a second quadrature phase signal (Q);

a programmable delay element pair receiving the quadrature phase signal pair, the programmable delay element pair being configured by a control signal, a control circuit generating the control signal in response to outputs of the programmable delay element pair; and wherein the programmable delay element pair adjusts a delay between the first quadrature phase signal and the second quadrature phase signal and adjusts a duty cycle of the received quadrature phase signal pair to thereby provide a corrected quadrature phase signal pair as the outputs of the programmable delay element pair for use in the receiver and the transmitter.

19. An apparatus comprising:

a quadrature phase generator generating two quadrature phase signal pairs ([I,Q] and [Ix,Qx]) wherein a first quadrature phase signal pair comprises a first quadrature phase signal (I) and a second quadrature phase signal (Q), and wherein a second quadrature phase signal pair comprises a third quadrature phase signal (Ix) and a fourth quadrature phase signal (Qx);

a control circuit generating a first control signal and a second control signal in response to outputs of a first programmable delay element pair and outputs of a second programmable delay element pair;

the first programmable delay element pair receiving the first quadrature phase signal pair, the first programmable delay element pair being configured by the first control signal; and the second programmable delay element pair receiving the second quadrature phase signal pair, the second programmable delay element pair being configured by the second control signal, wherein the first programmable delay element pair adjusts a delay between the first quadrature phase signal and the second quadrature phase signal and adjusts a duty cycle of the first quadrature phase signal pair to thereby provide a corrected first quadrature phase signal pair as outputs of the first programmable delay element pair, and wherein the second programmable delay element pair adjusts a delay between the third quadrature phase signal and the fourth quadrature phase signal and adjusts a duty cycle of the second quadrature phase signal pair to thereby provide a corrected second quadrature phase signal pair as outputs of the second programmable delay element pair.

20. The apparatus of claim 19, wherein the apparatus is integrated within a portable communication device.

21. The apparatus of claim 20, wherein the portable communication device provides multiband functionality.

22. A signal generator, comprising:

a quadrature phase generator providing a quadrature phase signal pair:

a programmable delay element pair receiving the quadrature phase signal pair; and a control circuit generating a control signal in response to outputs of the programmable delay element pair: and the programmable delay element pair adjusting a delay and adjusting a duty cycle of the quadrature phase signal pair to provide a corrected quadrature phase signal pair as the outputs of the programmable delay element pair.

23. The signal generator of claim 22, wherein the programmable delay element is implemented using one of: electrical technology, mechanical technology and a combination of electrical and mechanical technology.

* * * * *